Jan. 7, 1969 T. L. FITCH ET AL 3,421,090

CONTROL SYSTEM FOR PROVIDING AUTOMATIC FREQUENCY TRACKING OF A CARRIER SIGNAL IN AN UNSYMMETRICALLY FREQUENCY MODULATED VIDEO RECEIVER SYSTEM

Filed April 19, 1965

INVENTORS.
TOM L. FITCH
DONALD W. McMILLAN
LANCE E. RIGGIN

BY H. H. Losche

ATT'YS.

United States Patent Office
3,421,090
Patented Jan. 7, 1969

3,421,090

CONTROL SYSTEM FOR PROVIDING AUTOMATIC FREQUENCY TRACKING OF A CARRIER SIGNAL IN AN UNSYMMETRICALLY FREQUENCY MODULATED VIDEO RECEIVER SYSTEM

Tom L. Fitch, Donald W. McMillan, and Lance E. Riggin, Indianapolis, Ind., assignors to the United States of America as represented by the Secretary of the Navy Filed Apr. 19, 1965, Ser. No. 449,343
U.S. Cl. 325—346 2 Claims
Int. Cl. H04b *1/06*

ABSTRACT OF THE DISCLOSURE

An automatic frequency tracking circuit for enabling an FM video receiver to track the carrier frequency of an unsymmetrically modulated video signal having repetitive extreme signal conditions such as horizontal or vertical synchronizing pulses, utilizing a solid state diode detector, a tuner, and a D.C. amplifier. The detector produces a D.C. voltage, referenced to ground potential, proportional to the voltage level of the repetitive extreme signal conditions (sync pulses) which always maintain a fixed relationship with respect to the video receiver discriminator center frequency. The tuner adds algebraically a voltage proportional to the desired carrier frequency to the detector output voltage, and this combined voltage is amplified in the D.C. amplifier to produce the automatic frequency control voltage to control the video receiver system local oscillator to produce the desired tracking of the unsymmetrically modulated video signal.

The invention described herein may be manufactured and used by or for the Government of the United States of America for governmental purposes without the payment of any royalties thereon or therefor.

*Background of the invention*

The present invention is generally related to automatic frequency tracking systems and more specifically to automatic tracking of unsymmetrically frequency modulated (FM) video signals within a video receiving system.

As the use of video systems in various aerospace and missile applications rapidly increases, a need arises for a reliable tracking or control system for use within FM video receivers in order to enable such receivers to compensate for variations in the carrier frequency of the transmitted signal and/or in the beat frequency signal produced by the local oscillators within the receivers themselves. The present invention satisfies this need.

*Summary of the invention*

In conventional frequency modulated radio systems, the modulation deviates symmetrically about a center frequency enabling detection and utilization of the average value of this symmetrical deviation as a control potential for correction of the local oscillator within the FM radio receiver. However, in frequency modulated video systems the modulation does not deviate symmetrically about a center frequency, but instead varies about a center frequency with the changing degrees of lightness and darkness of the picture content. Thus average deviation cannot be utilized as a control potential for adjusting the local oscillator in an FM video receiving system, and other means must be provided to enable such a receiving system to track the carrier frequency of the transmitted FM video signal. The present invention provides an inexpensive, reliable, relatively uncomplicated tracking circuit for accomplishing this function when the FM video signal to be received includes, in addition to the varying picture content, repetitive extreme signal conditions such as horizontal and/or vertical synchronizing pulses of the type present in most composite video signals.

An object of the present invention is the provision of an automatic frequency tracking system for use in a video receiving system.

Another object is to provide a reliable, relatively uncomplicated automatic frequency tracking circuit to enable an FM video receiver to track the carrier frequency of an unsymmetrically modulated FM video signal.

A further object of the invention is the provision of a reliable, relatively uncomplicated automatic frequency tracking circuit to enable an FM video receiver to track the carrier frequency of an unsymmetrically modulated FM video signal which includes repetitive extreme signal conditions such as horizontal or vertical synchronizing pulses.

*Brief description of the drawings*

Other objects, advantages, and novel features of the invention will become apparent from the following detailed description of the invention when considered in conjunction with the accompanying figures of drawing wherein.

*Description of the preferred embodiment*

Figure 1:
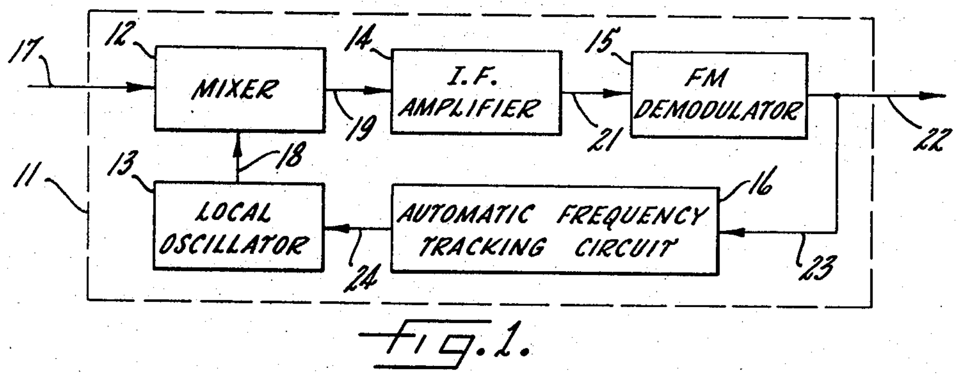
FIGURE 1 represents a block diagram of a portion of an FM video receiver including the invention.

Referring now to FIGURE 1, there is shown within a dotted block 11 a portion of an FM video receiver utilizing the invention in which are included a mixer circuit 12, a voltage tunable local oscillator 13, an intermediate frequency (IF) amplifier 14, and an FM demodulator (or discriminator) 15, all of which are well known in the art and perform their usual functions in association with the invention which is shown as block 16. A conductor 17 provides the modulated carrier signal from the antenna and initial amplification circuitry of the receiver to mixer 12. Local oscillator 13 is coupled to mixer 12 via a conductor 18, while a conductor 19 couples mixer 12 to IF amplifier 14 which is further coupled to demodulator 15 by a conductor 21. The output signal from demodulator 15 is coupled to following circuitry in the video receiver via a conductor 22, and to the invention in block 16 via a conductor 23. Block 16 is coupled to voltage tunable oscillator 13 via a conductor 24.

Figure 2:
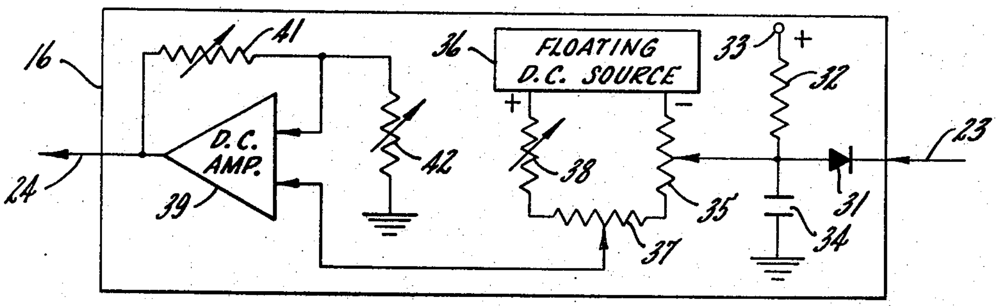
FIGURE 2 discloses a schematic diagram of one embodiment of the invention.

In FIGURE 2 conductor 23 is coupled to a diode rectifier 31 which is coupled via a resistance 32 to a source of direct current potential 33. A storage capacitance 34 has one terminal coupled to ground potential and the other terminal coupled to the junction of diode 31 and resistance 32, which junction is further coupled to the adjustable contact of a potentiometer 35. Potentiometer 35 has one terminal of its fixed resistance coupled to one terminal of a floating source of direct current potential 36, and the other terminal of its fixed resistance is coupled to a fixed resistance terminal of a potentiometer 37. Potentiometer 37 has the other terminal of its fixed resistance coupled via an adjustable resistance 38 to the other terminal of floating direct current potential source 36, and its adjustable contact is coupled to the input terminal of a direct current (D.C.) amplifier 39 which has its output terminal coupled to conductor 24, and via an adjustable resistance 41 to the feedback terminal of D.C. amplifier 39 which is also coupled via an adjustable resistance 42 to ground potential.

Figure 3:
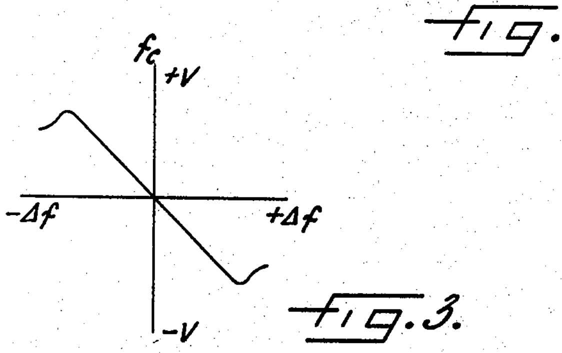
FIGURE 3 shows a curve representing the typical relationship of output voltage of an FM demodulator to input frequency.

The curve of FIGURE 3 is a representation of the output voltage of demodulator 15 as a function of the frequency of the input signal applied thereto. As indicated by the curve, an increase in applied frequency, above the center frequency $f_c$ of the demodulator, will result in the output voltage thereof applied to conductors 22 and 23 becoming more negative, while a decrease in the applied frequency above the center frequency $f_c$ will result in the output voltage thereof becoming less negative. In a similar manner, if the applied frequency is below the demodulator center frequency $f_c$, an increase in applied frequency will result in the demodulator output voltage becoming less positive while a decrease in applied frequency will result in that output voltage becoming more positive.

Figure 4:
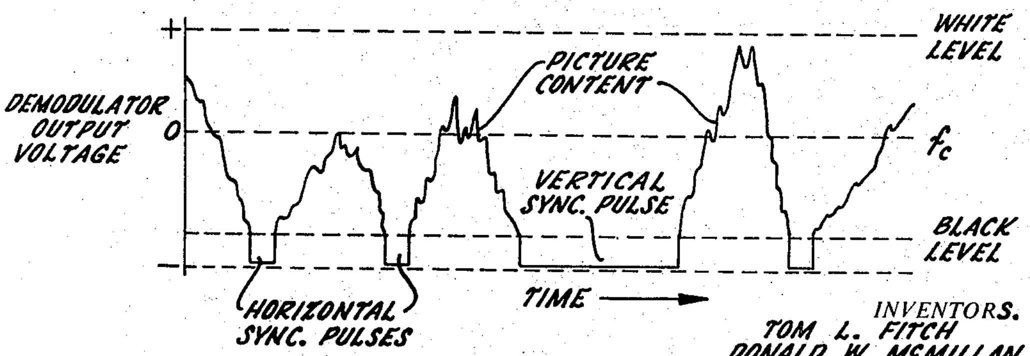
FIGURE 4 depicts an output waveform of the general type which would be provided by an FM demodulator to the invention, and to other circuitry within the video receiver.

The waveform of FIGURE 4 represents the type of output signal which will be presented by demodulator 15 to conductors 22 and 23. The portions of the waveform which vary in amplitude between "white level" and "black level" represent the picture content which varies unsymmetrically about the demodulator center frequency $f_c$; the small rectangular portions, or pulses, below the "black level" represent horizontal synchronizing pulses; and the large rectangular pulse below the "black level," having the same negative amplitude as the horizontal synchronizing pulses but occurring less frequently, represents the vertical synchronizing or blanking pulses. These horizontal and vertical synchronizing pulses represent repetitive extreme signals which always maintain a fixed relationship with respect to the carrier frequency $f_0$ upon which are transmitted and are, therefore, utilized by the present invention to enable it to perform its frequency tracking function.

An embodiment of the invention as shown in FIGURE 2 has been constructed and satisfactorily tested utilizing the following values and components:

| | |
|---|---|
| Diode **31** | 1N662 |
| Resistance **32** ............ohms.. | 2,000,000 |
| Variable resistances: | |
| **38** ............do.... | 0–2,500 |
| **41** ............do.... | 0–45,000 |
| **42** ............do.... | 0–10,000 |
| Potentiometers: | |
| **35** ............do.... | 2,500 |
| **37** ............do.... | 1,000 |
| Potential sources: | |
| **33** (volts D.C.) | +20 |
| **36** (volts D.C., floating) | 15 |
| Capacitance **34** ............microfarad.. | 1 |

It is to be understood that these particular components and values are presented only for illustrative purposes and are not intended to limit the scope of the invention in any way.

*Operation*

With respect to FIGURE 1, a frequency modulated video signal of carrier frequency $f_0$ is received and amplified in prior receiver circuitry not shown, and coupled via conductor 17 to mixer 12 where it is combined with an unmodulated signal of frequency $f_1$ provided by local oscillator 13 via conductor 18 in the usual manner, to produce a preselected intermediate frequency signal $f_2$ (frequency $f_1$ being a frequency greater than the carrier frequency $f_0$ by an amount equal to the preselected intermediate frequency $f_2$, i.e., $f_2=f_1-f_0$). This modulated intermediate frequency signal $f_2$ is coupled via conductor 19 to IF amplifier 14 where it is amplified and passed via conductor 21 to FM demodulator 15 having a center frequency $f_c$. Demodulator 15 converts the frequency modulated IF video signal $f_2$ into an amplitude modulated signal of the type shown in FIGURE 4 which is provided to following receiver circuitry via conductor 22 and, for frequency tracking and control purposes, to the invention in block 16 via conductor 23. As shown in FIGURE 4, this signal contains, in addition to the varying video or picture content portions, horizontal and vertical synchronizing pulses which maintain a fixed negative amplitude voltage relationship with respect to the intermediate frequency $f_2$ which, in turn, is directly dependent upon the carrier frequency $f_0$ of the composite video signal and upon the frequency $f_1$ produced by local oscillator 13. The present invention utilizes this voltage amplitude relationship, of the synchronizing pulses to IF frequency $f_2$, to produce a control voltage which is provided to voltage tuned local oscillator 13 via conductor 24 to cause oscillator 13 to produce a frequency $f_1$ which will "track" the received, and possibly drifting, carrier frequency $f_0$ in order to produce an intermediate frequency $f_2$ which will correspond to the center frequency $f_c$ of demodulator 15, thereby enabling the video receiver to utilize the possibly drifting received signal $f_0$.

Referring now to FIGURE 2, the operation of the invention occurs in the following manner. The output waveform of demodulator 15, of the type shown in FIGURE 4, passes via conductor 23 (referenced to ground in demodulator 15) to diode 31. Capacitance 34 is charged to the negative voltage amplitude of the synchronizing pulses (the horizontal and vertical synchronizing pulses being equal in amplitude, but the vertical pulses being of considerably greater duration and occurring less frequently than the horizontal pulses, as is well understood in the art) and discharges slightly between synchronizing pulses at a rate controlled by resistance 32 and positive source 33. Thus diode 31, resistance 32, potential source 33, and capacitance 34 form a detection circuit to provide a negative potential to the adjustable contact of potentiometer 35 which follows the level of the negative synchronizing pulses from demodulator 15, this level being proportional to intermediate frequency $f_2$. Floating direct current source 36, potentiometers 35 and 37, and adjustable resistance 38 form a tuning circuit to provide a control potential which is placed in series with, and algebraically added to, the detected negative potential level proportional to intermediate frequency $f_2$, which is coupled to the adjustable contact of potentiometer 35. This combined potential is coupled from the adjustable contact of potentiometer 37 to the input terminal of D.C. amplifier 39 where it is amplified to a level suitable for use as a control potential and coupled via conductor 24 to voltage tuned local oscillator 13 causing it to produce a frequency $f_1$ which follows or "tracks" the drifting carrier frequency $f_0$, enabling mixer 12 to produce and maintain an intermediate frequency $f_2$ equal to the center frequency $f_c$ of demodulator 15 (i.e., ignoring, for purposes of discussion, the modulation thereon). Adjustable resistances 41 and 42 in the feedback path of D.C. amplifier 39 enable adjustment of the gain thereof to the desired level for providing the voltage control of local oscillator 13. Potentiometer 37 may be mechanically coupled to the frequency dial assembly of the video receiver with which it is utilized so that when signals of different carrier frequencies ($f_0$) are to be selected, the control potential applied by the invention to local oscillator 13 will be varied in order to enable oscillator 13 to adjust its frequency $f_1$ accordingly, thereby causing mixer 12 to maintain the same intermediate frequency $f_0$. Adjustable resistance 38 permits adjustment of the rate of change of potentiometer 37, and potentiometer 35 enables adjustment of the proportion of tuner voltage which will be algebracially combined with the detected signal from capacitance 34. Thus adjustable resistance 38 and potentiometer 35 may be adjusted to enable the adjustable contact of potentiometer 37 to be correlated with the frequency dial assembly of the video receiver to which it may be mechanically coupled.

Thus it becomes apparent from the foregoing description and annexed drawing that the invention, a reliable automatic frequency tracking circuit to enable an FM video receiver to track the drifting carrier frequency of an unsymmetrically modulated video signal, is a useful and practical device having applications in the area of electronic frequency tracking and control circuitry.

Obviously many modifications and variations of the present invention are possible in the light of the above teachings. It is therefore to be understood that within the scope of the appended claims the invention may be practiced otherwise than as specifically described.

We claim:

1. A control system for providing automatic frequency tracking of a carrier signal in an unsymmetrically frequency modulated video receiver system, comprising:

a solid state diode detection means having one terminal for coupling to a demodulating means within a video receiver system for receiving a signal therefrom which includes information related to the carrier frequency of the signal being received by said video receiver system;

a storage capacitance means having one terminal coupled to ground potential and the other terminal thereof coupled to the other terminal of said diode detection means and further resistively coupled to a source of direct current potential, said storage capacitance means being adapted to store said information related to said carrier frequency after detection thereof by said diode detection means;

a tuning means coupled to said other terminal of said storage capacitance means for receiving therefrom, after detection and storage, said information related to said carrier signal, said tuning means producing a control signal by algebraically combining said information with an adjustable tuning potential provided therein; and an adjustable gain, direct current amplifying means having input means coupled to said tuning means for receiving said control signal, and having output means for coupling said control signal, after amplification, to a voltage tuned local oscillator within said video receiver system for controlling said local oscillator and causing it to track said carrier frequency of the signal being received by said video receiver system.

2. A control system for providing automatic frequency tracking of a carrier signal in an unsymmetrically frequency modulated video receiver system, comprising:

a solid state diode detection means having one terminal for coupling to a demodulating means within a video receiver system for receiving a signal therefrom which includes information related to the carrier frequency of the signal being received by said video receiver system;

a storage capacitance means having one terminal coupled to ground potential and the other terminal thereof coupled to the other terminal of said diode detection means and further resistively coupled to a source of direct current potential, said storage capacitance means being adapted to store said information related to said carrier frequency after detection thereof by said diode detection means;

a first potentiometer means having its adjustable contact coupled to said other terminal of said storage capacitance means for receiving therefrom, after detection and storage, said information related to said carrier signal;

a second potentiometer means having one terminal of its fixed resistance coupled to one terminal of the fixed resistance of said first potentiometer means;

a source of floating direct current potential having one terminal thereof coupled to the other terminal of the fixed resistance of said first potentiometer means, and having the other terminal thereof coupled via adjustable resistance means to the other terminal of said second potentiometer means; and an adjustable gain, direct current amplifying means having input means coupled to the adjustable contact of said second potentiometer means for receiving a control signal therefrom, and having output means for coupling said control signal, after amplification, to a voltage tuned local oscillator within said video receiver system for controlling said local oscillator and causing it to track said carrier frequency of the signal being received by said video receiver system.

References Cited

UNITED STATES PATENTS

| | | | |
|---|---|---|---|
| 2,481,902 | 9/1949 | Bradley | 325—423 XR |
| 2,915,626 | 12/1959 | Freedman | 325—423 XR |
| 2,916,545 | 12/1959 | Baugh | 325—346 XR |

KATHLEEN H. CLAFFY, *Primary Examiner.*

R. S. BELL, *Assistant Examiner.*

U.S. Cl. X.R.

325—423; 331—20